July 14, 1953 — M. REVERBERI — 2,645,517
ARTICULATED VEHICLE BODY CONNECTION
Filed April 11, 1951 — 2 Sheets-Sheet 1

Inventor
Mario Reverberi
By Robert E. Burns
Attorney

July 14, 1953     M. REVERBERI     2,645,517
ARTICULATED VEHICLE BODY CONNECTION Filed April 11, 1951     2 Sheets-Sheet 2

Inventor
Mario Reverberi
By Robert E. Burns
Attorney

Patented July 14, 1953

2,645,517

UNITED STATES PATENT OFFICE 2,645,517

ARTICULATED VEHICLE BODY CONNECTION

Mario Reverberi, Turin, Italy, assignor to Officine Viberti Società per Azioni, Turin, Italy Application April 11, 1951, Serial No. 220,391
In Italy April 19, 1950

5 Claims. (Cl. 296—1)

This invention relates to a device for connecting and establishing communication between two sections of a hinged vehicle.

According to this invention, in order to obtain an outline of the passage between the two body sections of the vehicle, aproximately equalling the outline of the vehicle, the two sections of the body are connected by means of a flexible and resilient diaphragm.

According to a preferred embodiment of the invention, the diaphragm connects the two vehicle sections through the interposition of a rigid inverted U-shaped body member having the external shape and appearance of the two body sections, thereby subdividing each flexible diaphragm into two portions of shorter length.

The bow is conveniently secured to the platform bridging the floor boards of the two vehicle body sections, which performs rotations in a horizontal plane of half the angle with respect to the rotation of one vehicle body section relative to the other.

According to a further embodiment of the invention, the diaphragm is flexible and extensible over part of the length only, the remaining portion being flexible but inextensible. The flexible extensible portion is accommodated within a recess formed in the body sections of the vehicle.

Further features and advantages of this invention will be understood from the following description, in which reference is made to the accompanying drawings, showing an embodiment thereof diagrammatically and by way of example.

Figure 1:
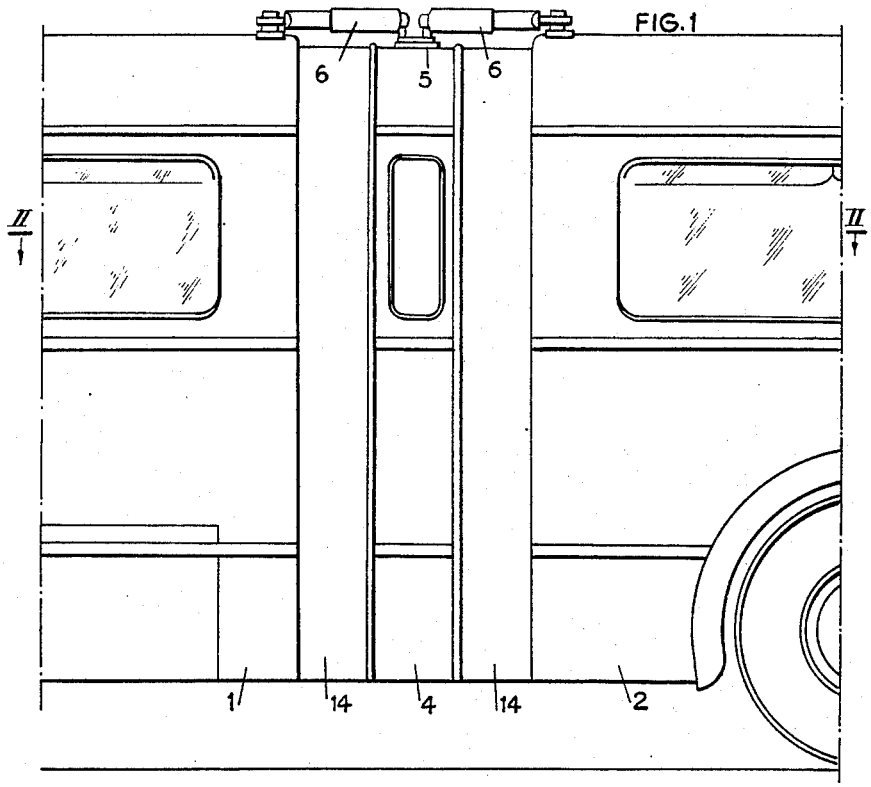
Figure 3:
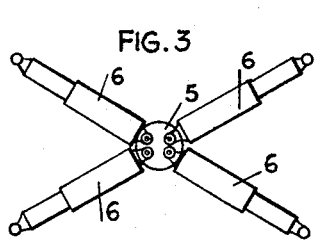
Figure 4:
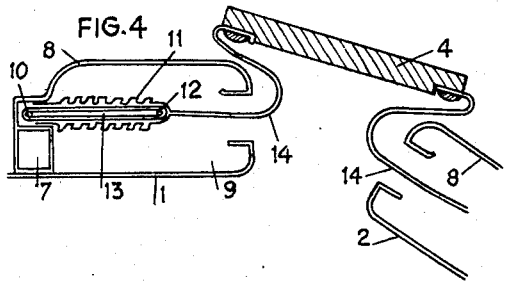
Figure 5:
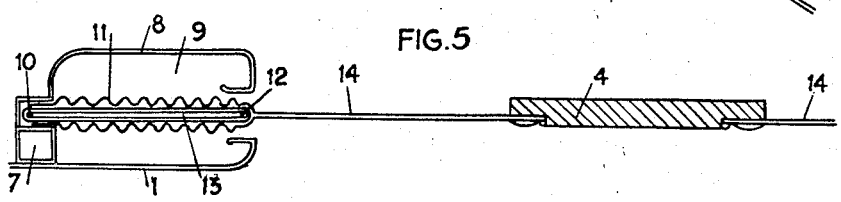
Figure 2:
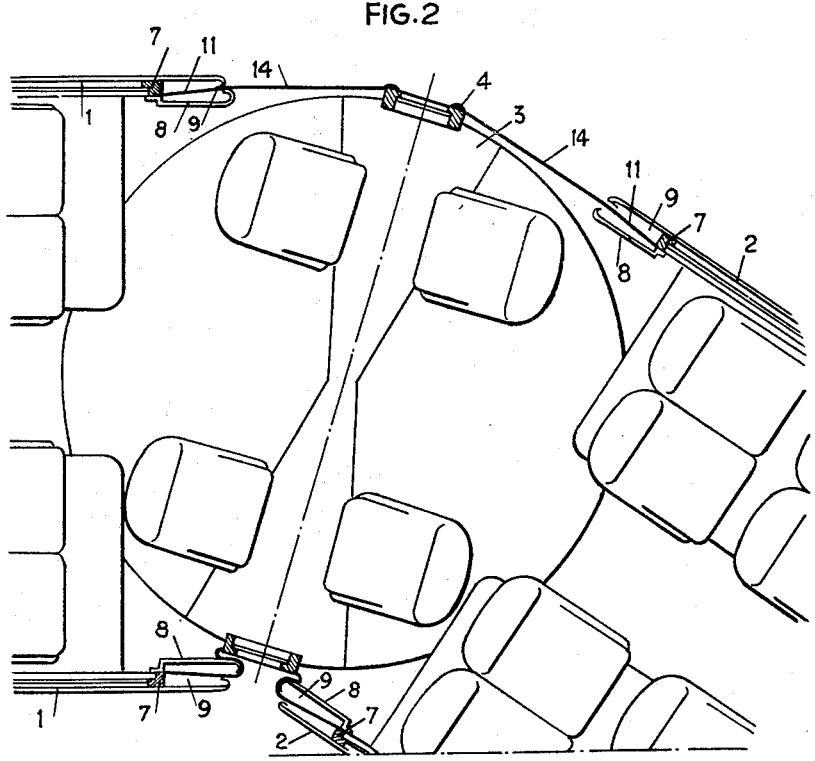
Figure 6:
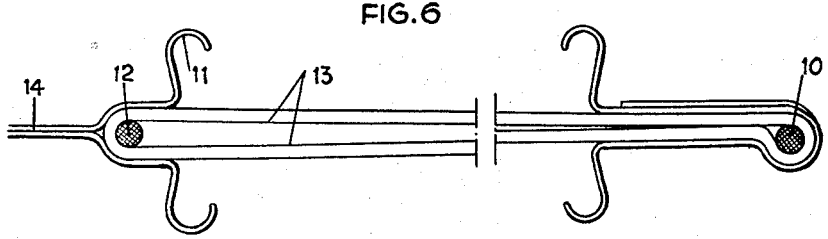

Figure 1 is a part side view of two sections of a hinged vehicle and connecting device therefor, Figure 2 is a section on line II—II of Figure 1, Figure 3 is a part plan view of Figure 1, Figure 4 is a detail view on an enlarged scale of one of the connecting diaphragms in the position taken as the vehicle drives over a curve, Figure 5 shows the same band in the position taken in straight drive, Figure 6 is a detail view on an enlarged scale of Figure 5.

1 and 2 denote the two sections of an hinged vehicle, of which the floor boards are bridged by a platform 3 performing rotations in a horizontal plane through an angle half that of the rotations of a vehicle section to the other. The platform 3 has secured thereto a body member 4 having the same bow shape as the two vehicle sections and which follows the angular displacements of the platform 3. To the top of the bow 4 is secured a plate 5 carrying the pivots for attachment of four telescopic shock absorbers 6 hinged two by two at their other ends to the vehicle sections 1, 2, respectively. The shock absorbers 6 avoid any oscillation or vibration of the bow 4.

7 denotes pillars of the coachwork of the vehicle, situated near the adjacent ends of the two sections 1, 2.

8 denotes inner metal sheet walls secured to said pillars, confining with the outer wall recess 9.

The rear end of the recess 9 has fixed thereto about a vertical rod 10 the rear end of the extensible portion of the connecting diaphragm, made of flexible but inextensible material such as leather, imitation leather, or the like bent to double bellows form.

The fore end of the extensible portion is connected to a second vertical rod 12, freely displaceable within the recess 9 and urged towards the pivot 10 by rubber elastics 13. In order to cause the fabric to form predetermined folds, equidistant rows of stitches are made in the portion 11 and are interrupted at regular intervals at the elastics.

The inextensible portion 14, of which the two layers contact each other, is made of the same material as the portion 11. The portion 14 is secured at its other end to the central bow along the whole perimeter of the cross section of the vehicle.

As is visible from Figure 1, when the vehicle drives straight, all the corrugated portion 11 of the band connecting the two vehicle sections, is concealed within the recess 9 and the bow 4, having an opening therein, as well as the smooth portion 14 of the connecting band only are visible. On assembly, the band is fitted in a pre-stretched condition so that, when the vehicle drives over a curve on the outer side of the latter, where the band is stretched, the corrugated portion is extracted overcoming the tension of the elastics 13, while on the inner side the band contracts under the action of the elastics which draw into the recess 9 also part of the smooth portion 14.

The device according to this invention affords over known devices the advantage that the normally visible portion is not corrugated to a bellows form, but is smooth and continuous. Moreover, the device affords the advantage that the rubber in it, which merely performs the function of an elastic, is protected against atmospheric agents and oxidising action of light by the waterproof fabric lining.

What I claim is:

1. In a vehicle comprising two body sections articulated to one another, each body section including a floor, side walls and a roof and having entrance openings facing one another, a platform mounted for rotation about a vertical axis between the floors of said body sections, a body member of reversed U-shape secured to said platform in a transverse vertical plane passing through the vertical axis of the platform, flexible diaphragms connecting the opposed ends of said body sections to said body member, each of said diaphragms being formed by two superposed sheets of flexible material and comprising a non-extensible smooth portion connected to said body member and a double bellows shaped end portion secured to the end of one of said body sections, the edges of said opposed ends of said body sections being formed with recesses adapted to receive the double bellows shaped end portions of said diaphragms, and resilient means disposed within the double bellows normally urging said bellows shaped portions into said recesses to hold them in collapsed position therein.

2. In a vehicle comprising two body sections articulated to one another, each body section including a floor, side walls and a roof and having entrance openings facing one another, a rotatable platform bridging the floors of said body sections, a rigid arc-shaped body member connected to said platform and having the shape and external appearance of the body sections interposed between the opposed ends of said sections, flexible diaphragms connecting the opposed ends of said sections to said body member, each diaphragm being formed by two superposed sheets of flexible material and comprising a non-extensible smooth intermediate portion, and end portions formed by the two sheets pleated to bellows shape and secured to the opposed ends of said body sections, the edges of said opposed ends of said body sections being formed with recesses adapted to receive the bellows shaped end portions and rubber elastic means enclosed within said bellows-shaped end portion normally urging said bellows shaped portions into said recesses to hold them in collapsed position therein.

3. A vehicle as defined in claim 2, wherein the elastic means holding the bellows in collapsed position are prestretched before assembly in such manner that when the vehicle rounds a curve said elastic means draw a part of the non-extensible intermediate portion of the flexible diaphragm into the recesses at the ends of said body sections.

4. A vehicle as defined in claim 2, further comprising a resilient tension device connecting said body member with the vehicle body sections to prevent vibration of the member when the vehicle is in motion.

5. A vehicle as defined in claim 2, further comprising a resilient tension device connecting said body member with the vehicle body sections to prevent vibration of the member when the vehicle is in motion.

MARIO REVERBERI.

References Cited in the file of this patent

UNITED STATES PATENTS

| Number | Name | Date |
|---|---|---|
| 523,435 | Libbey | July 24, 1894 |
| 1,535,799 | Adams | Apr. 28, 1925 |
| 2,195,247 | Hendrickson | Mar. 26, 1940 |
| 2,264,470 | Bugatti | Dec. 2, 1941 |
| 2,269,685 | Potthoff | Jan. 13, 1942 |
| 2,407,007 | Henrichsen | Sept. 3, 1946 |

FOREIGN PATENTS

| Number | Country | Date |
|---|---|---|
| 374,802 | Great Britain | June 16, 1932 |